United States Patent [19]

Teraoka et al.

[11] Patent Number: 5,357,339
[45] Date of Patent: Oct. 18, 1994

[54] MULTI-AXIS FIBER-OPTIC GYROSCOPE ASSEMBLY IN WHICH EACH GYROSCOPE COMPRISES ⅓ OF A SPECIFIC SHAPE

[75] Inventors: Tatsuo Teraoka; Yoshiyuki Hiramoto; Hirokazu Shiga; Shigeo Toya, all of Hitachi, Japan

[73] Assignee: Hitachi Cable Limited, Tokyo, Japan

[21] Appl. No.: 903,418

[22] Filed: Jun. 24, 1992

[30] Foreign Application Priority Data

Jun. 25, 1991 [JP] Japan ................. 3-153379

[51] Int. Cl.$^5$ .............................. G01C 19/72
[52] U.S. Cl. ................................. 356/350
[58] Field of Search ......................... 356/350

[56] References Cited

PUBLICATIONS

"Progress in Optical Fiber Gyroscopes Using Integrated Optics", Lefevre et al, 1986.

*Primary Examiner*—Samuel A. Turner
*Attorney, Agent, or Firm*—Dykema Gossett

[57] ABSTRACT

Each fiber-optic gyroscope unit is shaped like a tetragonal cone. A square plate (51) is used as a base which holds a light source module (52), a light receiving unit (detector) (53) and an optical fiber coil (54). Directional couplers (56a), (56b) are also mounted on the base (51). A phase modulator (55) which includes a piezoelectric element is disposed inside the optical fiber coil (54). A signal processing circuit board (58) which has pedestals (59) stands on the base (51) such that it positions above the optical fiber coil (54). A polarizer (510) is wound around the optical fiber coil (54). A reinforcement member (511) is also provided. All these components are so arranged as not to extend out of the tetragonal cone (OABCO*) which defines its own unit region. Three identical fiber-optic gyroscope units are combined by connecting members (512, 513, 514) to form a single fiber-optic gyroscope to detect rotational angular velocities about three orthogonal axes. Since identical units (50) are used, the assembly is easy, and since the three units (50) are combined with respect to the axis of symmetry, the combined units (50) form a compact gyroscope.

6 Claims, 4 Drawing Sheets

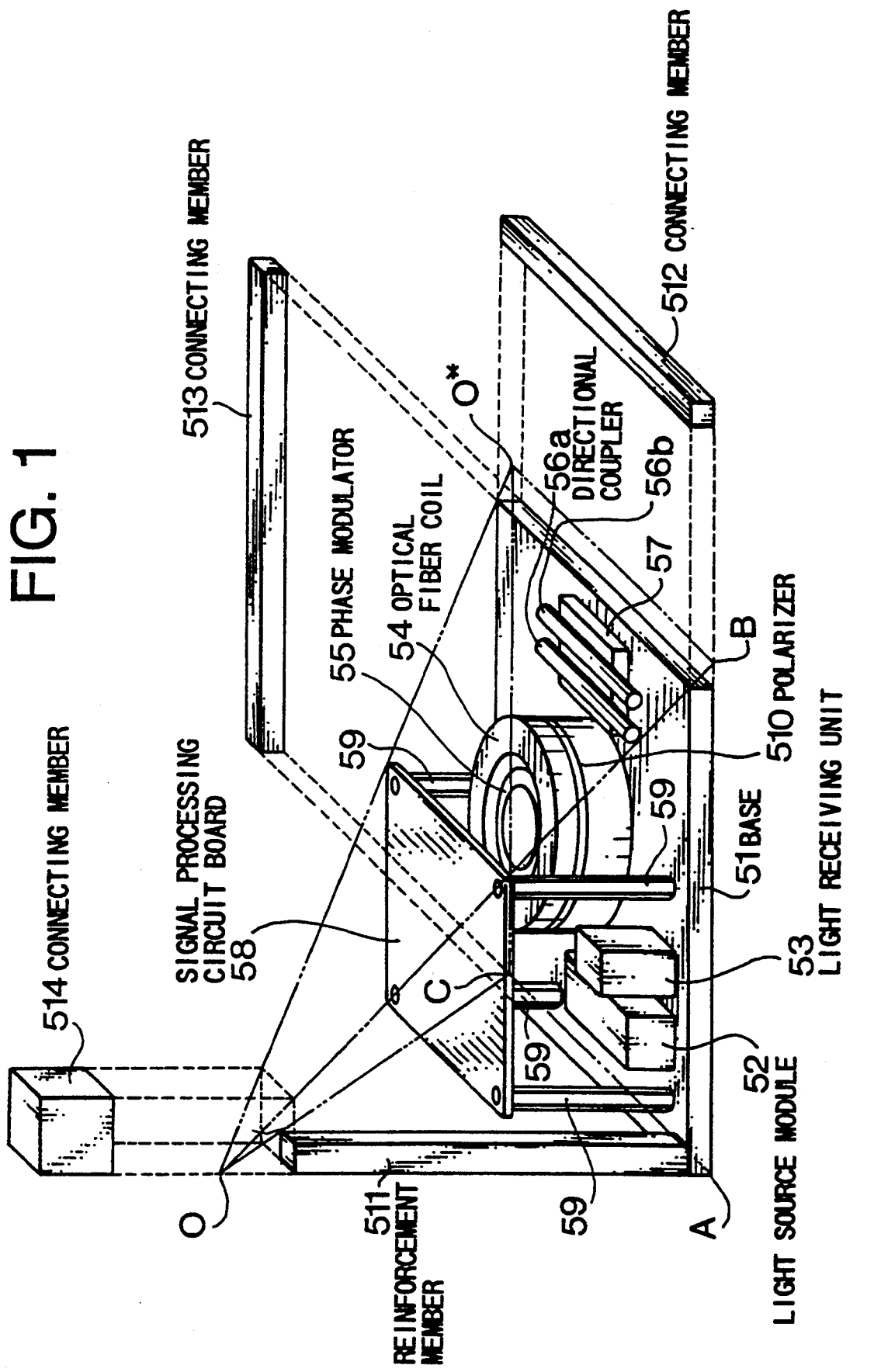

UNIT 1   UNIT 2   UNIT 3

— OPTICAL FIBER WIRING
---- ELECTRICAL WIRING

MULTI-AXIS FIBER-OPTIC GYROSCOPE ASSEMBLY IN WHICH EACH GYROSCOPE COMPRISES ⅓ OF A SPECIFIC SHAPE

BACKGROUND OF THE INVENTION

1. Technical Field

The present invention relates to a fiber-optic gyroscope and a unit thereof, and more particularly to a compact three-axis fiber-optic gyroscope and a unit thereof.

2. Background Art

A sensor which is simply mounted on a moving body and is capable of detecting a rotational angular velocity or angle without any external information, to enable control of the attitude or the position of the moving body is generally called "gyroscope" or "gyro". Fiber-optic gyroscopes are gyroscopes used to detect rotational velocities or angles by use of the Sagnac effect. In recent years, single-axis fiber-optic gyroscopes have come to be used in the industrial field because of their following characteristics:

(1) No movable parts and simple construction;
(2) Short starting time;
(3) Can be constructed in a smaller size with lighter weight;
(4) Small power consumption;
(5) Wide dynamic ranges; and
(6) Suitable for mass production and cost reduction.

A block diagram of a typical fiber-optic gyroscope is shown in FIG. 4 of the accompanying drawings. The illustrated fiber-optic gyroscope includes a light source 11, a light receiver (detector) 12, an optical fiber coil 18, a phase modulator 14, directional couplers 15a and 15b, a polarizer 17 and a circuit board 16 with a signal processing circuit mounted thereon. A light beam emitted from the light source 11 passes through the directional coupler 15a. After polarization noises are removed from the light beam by the polarizer 17, the light beam is split by the directional coupler 15b into two light beams, which is conducted along two optical paths, and these two light beams propagate through the optical fiber coil 18 as a clockwise beam and a counterclockwise beam, respectively. The optical fiber coil 18 is a coil of optical fiber which functions as an angular velocity sensor of the fiber-optic gyroscope. The rotation of the fiber-optic gyroscope 18 causes a phase difference between the clockwise beam and the counterclockwise beam, and the amount of rotation can be known by detecting the phase difference. Therefore, there is obtained only the amount of rotation about the center axis of the fiber-optic gyroscope 18, namely, only the amount of rotation around one axis can be known. The phase modulator 14 operates to give a phase bias of $\pi/2$ between the clockwise and counterclockwise beams, to realize a desired sensitivity. The clockwise and counterclockwise beams propagating through the optical fiber coil 13 join at the directional coupler 15b and become an interference beam due to the phase difference therebetween. Then, the interference beam is so directed as to pass through the polarizer 17 and the directional coupler 15a, in a direction reverse to the passage of the above emitted light beam, and introduced into the light receiver (detector) 12. In the light receiver 12, the intensity of the interference beam is measured and the intensity is converted into an amount of rotation by the signal processing circuit mounted on the circuit board 16. Generally, circuits for driving the light source 11 and the phase modulator 14 are also mounted on the circuit board 16.

However, the single optical fiber coil can only detect the amount of rotation about a single axis, as described above. Therefore, three optical fiber coils are required to detect the attitude of an object which moves in three dimensions.

In addition, these optical fiber coils should have their center axes arranged orthogonal to each other. When three optical fiber coils for the three axes respectively are separately installed, a large installation space is necessary. In order to reduce the space, the conventional optical fiber coils of the fiber-optic gyroscope have been formed in different sizes as shown in FIG. 5. Specifically, the smallest coil 23 is installed in the medium coil 22 and the medium coil 22 is installed in the largest coil 21. In this construction, however, the assembling is not easy and mass production becomes difficult.

On the other hand, when the three single-axis fiber-optic gyroscopes (generally each gyroscope has a rectangular parallelopiped outer shape and includes the above mentioned type of optical components and signal processing circuitry) simply connected together, the whole system becomes very large.

Japanese Patent Application Publication, Publication No. 61-266911, titled "Surveying Instrument Using Optical Fiber Gyro", published Nov. 26, 1986, owned by Nippon Kogaku Kabushiki Kaisha, discloses a gyroscope similar to one illustrated in FIG. 5 and a U.S. Pat. No. 4,893,930 issued to Garret et al, Jan. 16, 1990 discloses a "Multiple Axis, Fiber Optic Interferometric Seismic Sensor".

SUMMARY OF THE INVENTION

One object of the present invention is to provide a novel fiber-optic gyroscope, which is comprised of plural gyroscope units but compact as a whole and suitable for mass production.

The present invention is also directed to a single gyroscope unit.

According to one aspect of the present invention, there is provided a three-axis fiber-optic gyroscope which includes three single-axis fiber-optic gyroscope units to detect rotational angular velocities about three orthogonal axes. Each single-axis fiber-optic gyroscope unit detects a rotational angular velocity about one axis. Each single-axis fiber-optic gyroscope unit includes at least all the components necessary for itself to operate as an ordinary fiber-optic gyroscope, namely, a light source, a light receiver (detector), a sensing coil and a gyroscope signal processing circuit. The shape of the single-axis fiber-optic gyroscope unit is the one obtained by dividing a cube, for example, into three equal bodies. The three units are symmetric to each other with respect to the rotation center axis of the cube (or the axis of symmetry of the cube). The three single-axis gyroscope units are combined with each other, directly or via certain elements, such that tile three units are located at three symmetric positions with respect to the axis of the symmetry of the three-axis fiber-optic gyroscope. With this arrangement, three rotational angular velocities about the three axes, which are orthogonal to each other, can be detected.

The present invention is also directed to the single gyroscope unit, which constitutes the above described gyroscope in combination with two other identical gyroscope units.

The shape of the unit may be the one illustrated in FIG. 2, if a cubic body is selected as the shape of gyroscope. The cube is divided into three equal bodies with respect to the axis of symmetry. In FIG. 2(a), the vertexes are indicated by the reference characters A to F, O and O*. Geometric figures obtained by dividing the cube at the planes OBO*, OCO* and OEO* which respectively contain diagonals OB, OC and OE on faces of the cube are shown in FIG. 2(b) as Unit 1, Unit 2 and Unit 3, respectively. The three units are all congruent, that is, they all have the same shape of a tetragonal pyramid with a square base. When the three units are united together to have a cubic configuration, the line OO* of the cubic configuration becomes the axis of symmetry.

The shape of the unit is not limited to the illustrated one (perfect tetragonal pyramid). For instance, the unit shape may have a protrusion on itself, as shown in FIG. 3. In this case, a recess or depression conforming with the protrusion is formed at another face of the same unit. The positions of the protrusion and the recess of the same unit are symmetrical with respect to the axis of symmetry (line OO*). In FIG. 3, Unit 1 has a face OBO* provided with a protruding portion (hatched portion) and has a face OCO* provided with a recessed portion congruent with the protruding portion. The shapes of the protrusion and recess are symmetrical with respect to the line OO*. Units 2 and 3 have the same shape as the unit 1, and these three units form a cubic assembly when combined in symmetrical positions with respect to the line OO*. The phrase "the shape of the unit or the unit shape" used herein does not necessarily refer to the actual shape of the gyroscope unit; Instead, this phrase refers to the spatial region in which the components necessary to the fiber-optic gyroscope are disposed. In addition, the original shape is not limited to the cube. For example, other polyhedrons such as hexahedrons and octahedron are satisfactory. A sphere is also acceptable. In short, any geometrical figure may be used as long as the geometrical figure can be divided into three bodies which are equal to each other and symmetrical to each other with respect to a certain axis (the axis of symmetry).

According to the present invention, the three-axis fiber-optic gyroscope can be manufactured using a plurality of identical one-axis gyroscope units. Therefore, the mass production of the three-axis fiber-optic gyroscope becomes easier. In addition, since the three units are combined together in axially symmetrical positions to form a united solid figure as a whole, space for installation is reduced and a compact system can be realized.

BRIEF DESCRIPTION OF THE DRAWINGS

FIG. 1 is a perspective view of a fiber-optic gyroscope according to one embodiment of the present invention;

DESCRIPTION OF THE PREFERRED EMBODIMENTS

Figure 4:
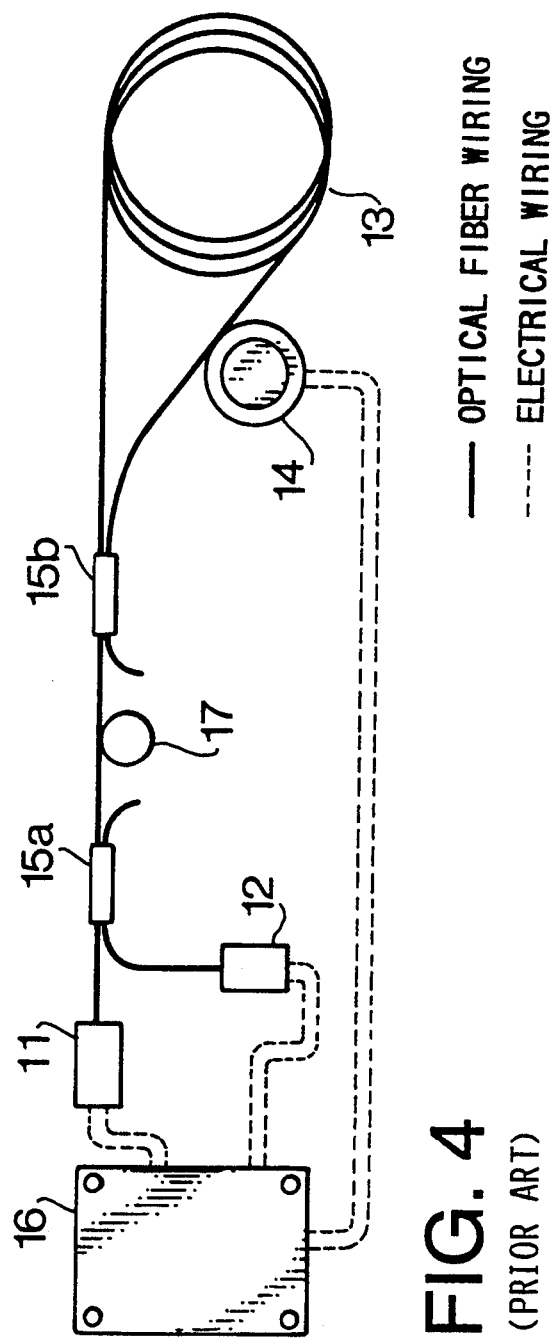
FIG. 4 is a block diagram illustrating components of a fiber-optic gyroscope according to the prior art.
Figure 5:
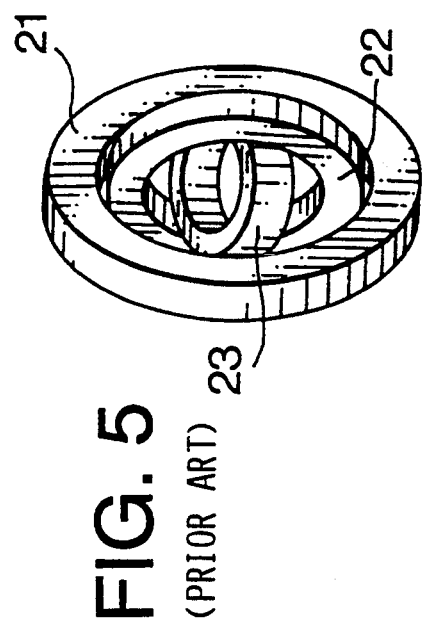
FIG. 5 is a perspective view showing an example of coil construction in a three-axis fiber-optic gyroscope according to the prior art.

The present invention will be explained more in detail with reference to FIGS. 1 and 4.

Referring to FIG. 1, illustrated is a single-axis gyroscope unit 50 to detect a rotational angular velocity about a single axis. The spatial region (or unit shape) for disposing tile components of the one-axis unit 50 therein is a tetragonal pyramid with a square base, as in the example illustrated in FIG. 2. The tetragonal pyramid of FIG. 1, which has the vertexes O, A, B, C and O*, corresponds to Unit 1 of FIG. 2, which is the tetragonal pyramid having the vertexes O, A, B, C and O*.

As illustrated in FIG. 1, a square plate 51 with each side 100 mm in length is used as a base, on which a light source module 52, a light receiving unit (detector) 53 and an optical fiber coil 54 (sensing coil) are mounted. Further, two directional couplers 56(a) and 56(b) are also mounted on the base 51 with a single mount 57. A phase modulator 55 which includes a cylindrical piezoelectric element is contained in the optical fiber coil 54. The directional couplers 56(a) and 56(b) are connected to optical fibers (not shown) like the directional couplers 15a and 15b of FIG. 4.

A rectangular signal processing circuit board 58 is also mounted on the base 51 via four pedestals 59 such that the circuit board 58 positions above the optical fiber coil 54. A polarizer 510 of the optical fiber type is wound around the optical fiber coil 54. A reinforcement member 511 extends along the line A-O which is parallel to tile center axis of the optical fiber coil 54.

All these components are so arranged as not to extend out of the unit region (tetragonal pyramid OABCO*). After three such one-axis gyroscope units are prepared, the units are combined together by means of connecting members 512, 513 and 514 in the manner as explained with FIG. 2, thereby obtaining a single three-axis fiber-optic gyroscope. The connecting member 512 extends along the line B-O*, the connecting member 513 extends along the line C-O* and the connecting member 514 is located at the point O. As mentioned earlier, since the components of each one-axis gyroscope unit are all disposed within their own unit region, none of the components of each one-axis unit would interfere with the components of other one-axis units during the assembly.

As understood from the foregoing, this embodiment is characterized in that (i) a single-axis fiber-optic gyroscope which includes optical components and signal processing circuit, both are necessary for the single-axis fiber-optic gyroscope to operate as an ordinary fiber-optic gyroscope, is prepared as a one unit and (ii) this one unit has a shape obtained by dividing a cube, for example, into three symmetrical bodies. The three units which constitutes a single three-axis gyroscope have the exactly same shape. This makes the assembly of the units easier or makes the mass production easier and reduces the manufacturing cost.

In this embodiment, the three units are combined by the connecting members and the connecting members may extend out of the tetragonal pyramid regions since they span from one unit to another. However, the embodiment should be considered within the scope of the present invention.

Figure 2A:
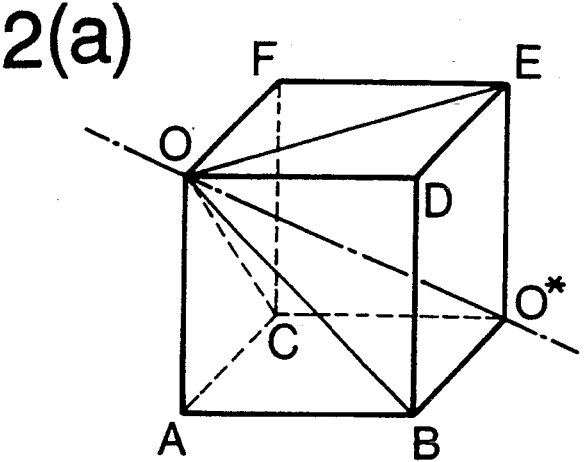
FIG. 2 and 2(b) are a set of views showing a unit shape according to the present invention.
Figure 2B:
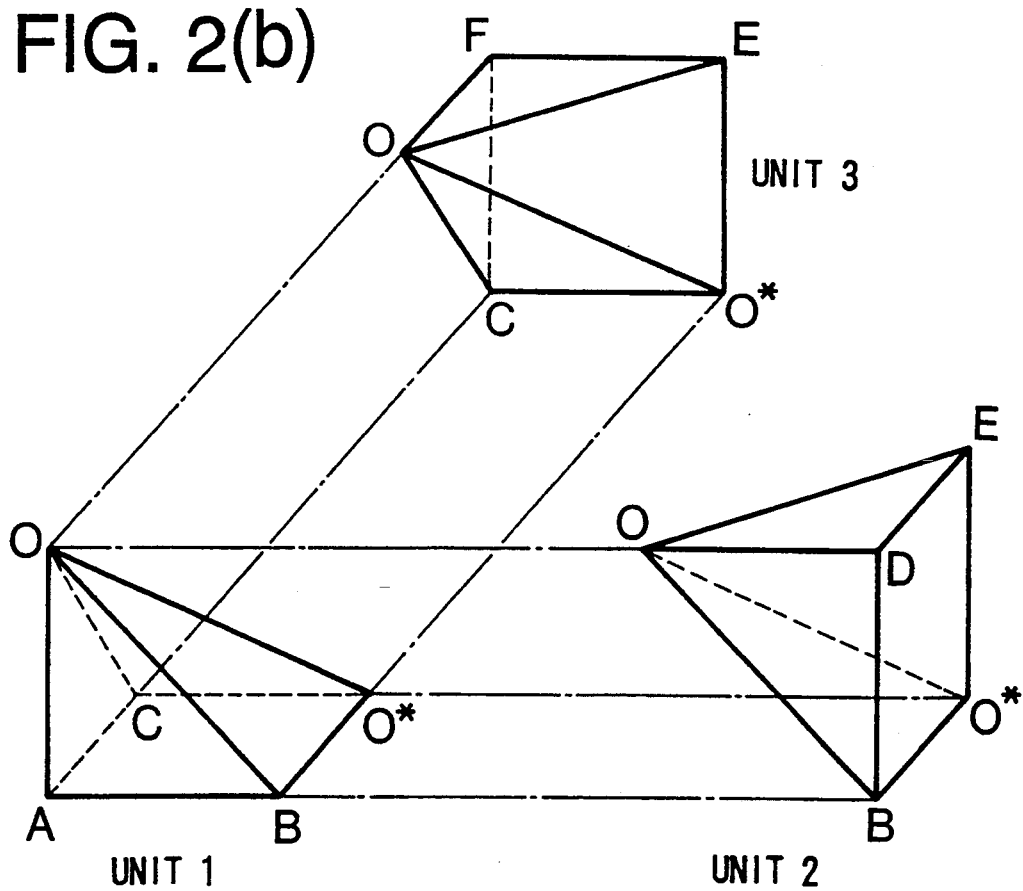
Figure 3:
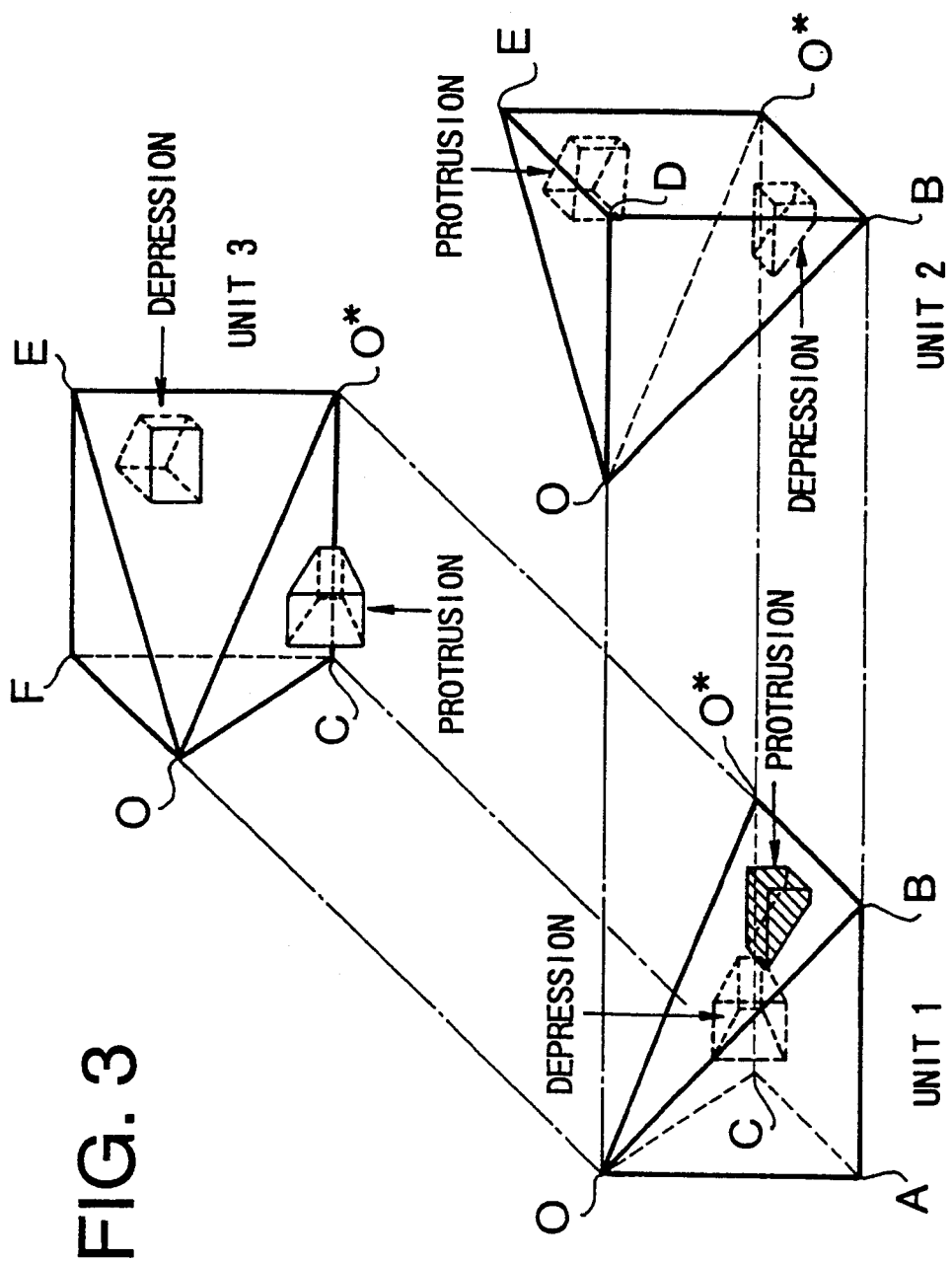
FIG. 3 is a perspective view showing another unit shape according to the present invention.

In the illustrated embodiment, the cubic shape has the sharp vertexes A-F, O and O* (FIG. 2(a)). However, these vertexes may be rounded or chamfered and such shapes also fall in the scope of the present invention.

We claim:

1. A fiber-optic gyroscope, comprising:
three fiber-optic gyroscope units (50), each gyroscope unit (50) including optical components (52–56) and a signal processing circuit (58) for allowing the unit (50) to operate as a fiber-optic gyroscope to detect rotational angular velocity about one axis, each gyroscope unit (50) having a shape obtained by dividing a polyhedron solid into three equal bodies which are symmetrical with respect to the axis of symmetry of the solid, and the three single-axis gyroscope units (50) being united together in symmetrical positions with respect to the axis of symmetry to form a fiber-optic gyroscope which can detect rotational angular velocities about three orthogonal axes.

2. A fiber-optic gyroscope, comprising:
three fiber-optic gyroscope units (50), each gyroscope unit (50) including optical components (52–56) and a signal processing circuit (58) for allowing the unit (50) to operate as a fiber-optic gyroscope to detect rotational angular velocity about one axis, each gyroscope unit (50) having a shape obtained by dividing a solid cube into three equal bodies which are symmetrical with respect to the axis of symmetry of the solid, and the three single-axis gyroscope units (50) being united together in symmetrical positions with respect to the axis of symmetry to form a fiber-optic gyroscope which can detect rotational angular velocities about three orthogonal axes.

3. A fiber-optic gyroscope, comprising:
three fiber-optic gyroscope units (50), each gyroscope unit (50) including optical components (52–56) and a signal processing circuit (58) for allowing the unit (50) to operate as a fiber-optic gyroscope to detect rotational angular velocity about one axis, each gyroscope unit (50) having a shape obtained by dividing a solid sphere into three equal bodies which are symmetrical with respect to the axis of symmetry of the solid, and the three single-axis gyroscope units (50) being united together in symmetrical positions with respect to the axis of symmetry to form a fiber-optic gyroscope which can detect rotational angular velocities about three orthogonal axes.

4. A fiber-optic gyroscope unit for detecting a rotational angular velocity about one axis, comprising:
optical components (52–56);
a signal processing circuit (58),
the unit (50) having a shape obtained by dividing a polyhedron solid into three equal bodies which are symmetrical with respect to the axis of symmetry of the solid.

5. A fiber-optic gyroscope unit for detecting a rotational angular velocity about one axis, comprising:
optical components (52–56);
a signal processing circuit (58),
the unit (50) having a shape obtained by dividing a solid cube into three equal bodies which are symmetrical with respect to the axis of symmetry of the solid.

6. A fiber-optic gyroscope unit for detecting a rotational angular velocity about one axis, comprising:
optical components (52–56);
a signal processing circuit (58),
the unit (50) having a shape obtained by dividing a solid sphere into three equal bodies which are symmetrical with respect to the axis of symmetry of the solid.

* * * * *